(12) United States Patent
Millet et al.

(10) Patent No.: US 9,176,913 B2
(45) Date of Patent: Nov. 3, 2015

(54) COHERENCE SWITCH FOR I/O TRAFFIC

(75) Inventors: Timothy J. Millet, Mountain View, CA (US); Muditha Kanchana, San Jose, CA (US); Shailendra S. Desai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 25 days.

(21) Appl. No.: 13/226,718

(22) Filed: Sep. 7, 2011

(65) Prior Publication Data

US 2013/0061003 A1    Mar. 7, 2013

(51) Int. Cl.
*G06F 13/40* (2006.01)
*G06F 21/00* (2013.01)
*G06F 13/00* (2006.01)

(52) U.S. Cl.
CPC ......... *G06F 13/4022* (2013.01); *Y02B 60/1228* (2013.01); *Y02B 60/1235* (2013.01)

(58) Field of Classification Search
CPC ............ G06F 13/4022; Y02B 60/1235; Y02B 60/1228
USPC ........................................................ 711/141
See application file for complete search history.

(56) References Cited

U.S. PATENT DOCUMENTS

| | | | |
|---|---|---|---|
| 4,897,833 A | 1/1990 | Kent et al. | |
| 5,392,434 A | 2/1995 | Bryant et al. | |
| 5,584,017 A * | 12/1996 | Pierce et al. | 711/146 |
| 5,774,684 A | 6/1998 | Haines et al. | |
| 6,275,888 B1 | 8/2001 | Porterfield | |
| 6,341,334 B1 | 1/2002 | Kamemaru | |
| 6,434,649 B1 | 8/2002 | Baker et al. | |
| 6,529,968 B1 * | 3/2003 | Anderson | 710/22 |
| 6,601,151 B1 | 7/2003 | Harris | |
| 6,832,279 B1 | 12/2004 | Potter et al. | |
| 6,836,813 B1 | 12/2004 | Gulick | |

(Continued)

FOREIGN PATENT DOCUMENTS

| | | |
|---|---|---|
| EP | 1 313 023 | 5/2003 |
| EP | 1308862 | 5/2003 |

OTHER PUBLICATIONS

Office Action from Chinese Application No. 200680037568.4, mailed Aug. 10, 2009.

(Continued)

*Primary Examiner* — Michael Alsip
(74) *Attorney, Agent, or Firm* — Rory D. Rankin; Meyertons, Hood, Kivlin, Kowert & Goetzel, P.C.

(57) ABSTRACT

A system, apparatus, and method for routing traffic in a SoC from I/O devices to memory. A coherence switch routes coherent traffic through a coherency port on a processor complex to a real-time port of a memory controller. The coherence switch routes non-coherent traffic to a non-real time port of the memory controller. The coherence switch can also dynamically switch traffic between the two paths. The routing of traffic can be configured via a configuration register, and while software can initiate an update to the configuration register, the actual coherence switch hardware will implement the update. Software can write to a software-writeable copy of the configuration register to initiate an update to the flow path to memory for a transaction identifier. The coherence switch detects the update to the software-writeable copy, and then the coherence switch updates the working copy of the configuration register and implements the new routing.

20 Claims, 9 Drawing Sheets

(56) References Cited

U.S. PATENT DOCUMENTS

Figure 1:
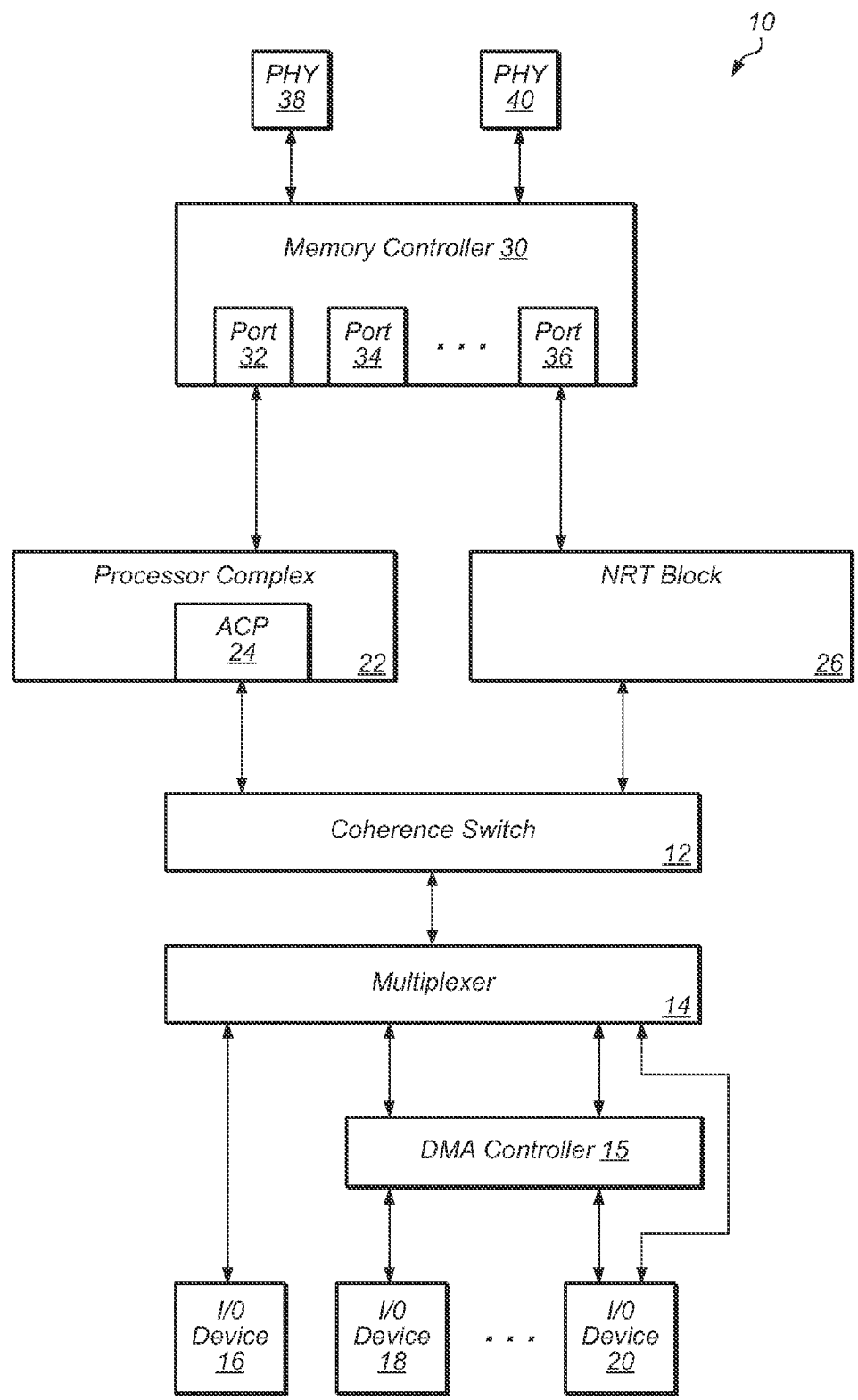

| | | | |
|---|---|---|---|
| 6,912,612 B2* | 6/2005 | Kapur et al. | 710/309 |
| 6,959,364 B2* | 10/2005 | Safranek et al. | 711/146 |
| 7,028,115 B1 | 4/2006 | Rowlands et al. | |
| 7,360,008 B2 | 4/2008 | Sistla et al. | |
| 7,480,770 B2* | 1/2009 | Zeffer et al. | 711/141 |
| 7,549,024 B2* | 6/2009 | Piry et al. | 711/141 |
| 7,617,329 B2* | 11/2009 | Quach et al. | 709/253 |
| 7,694,025 B1 | 4/2010 | Norrie | |
| 7,752,366 B2 | 7/2010 | Subramanian et al. | |
| 7,921,253 B2 | 4/2011 | Saripalli | |
| 2001/0037435 A1 | 11/2001 | Van Doren | |
| 2002/0032796 A1 | 3/2002 | Van Loo | |
| 2002/0087804 A1 | 7/2002 | Khare et al. | |
| 2003/0065843 A1 | 4/2003 | Jones et al. | |
| 2004/0117561 A1 | 6/2004 | Quach et al. | |
| 2004/0117577 A1 | 6/2004 | Bloks | |
| 2004/0165598 A1 | 8/2004 | Shrimali et al. | |
| 2006/0064563 A1* | 3/2006 | Hobson | 711/170 |
| 2006/0187958 A1 | 8/2006 | Clark et al. | |
| 2007/0165596 A1 | 7/2007 | Boyd et al. | |
| 2008/0091884 A1 | 4/2008 | Piry et al. | |
| 2008/0104378 A1 | 5/2008 | Huang et al. | |
| 2009/0024833 A1 | 1/2009 | Deneroff et al. | |
| 2009/0037624 A1 | 2/2009 | Saripalli | |
| 2009/0307408 A1 | 12/2009 | Naylor | |
| 2009/0327616 A1 | 12/2009 | Conway et al. | |
| 2010/0205380 A1* | 8/2010 | Saripalli | 711/146 |
| 2010/0281231 A1 | 11/2010 | Krishnan et al. | |
| 2011/0016338 A1 | 1/2011 | Williamson et al. | |
| 2011/0060879 A1 | 3/2011 | Rogers et al. | |

OTHER PUBLICATIONS

"PCI Express Base Specification," vol. 1, Rev. 1.0, Apr. 29, 2002, pp. 1-416, XP002403188.

International Search Report for PCT/US2006-031520, mailed Dec. 12, 2006, 12 pages.

Search Report in EP Application No. 12183475.8—2212, issued Nov. 28, 2012, pp. 1-6.

International Search Report and Written Opinion in application No. PCT/US2012/053963 mailed Nov. 23, 2012.

Extended Search Report in EP Application No. 12183475.8—1956 / 2568389, Mar. 18, 2013, pp. 1-13.

Office Action from Korean Application No. 10-2012-99594, mailed Sep. 17, 2013, pp. 1-9.

Office Action in Taiwan Patent Application No. 101132820, mailed Dec. 1, 2014, 15 pages.

Notification of the First Office Action in Chinese Application No. 201210331633.1, mailed Dec. 31, 2014, 24 pages.

* cited by examiner

| Address | Routing Indicator |
|---------|-------------------|
| 0 | 0 or 1 |
| 1 | 0 or 1 |
| 2 | 0 or 1 |
| ... | ... |
| 511 | 0 or 1 |

74

FIG. 5

COHERENCE SWITCH FOR I/O TRAFFIC

BACKGROUND

1. Field of the Invention

The present invention relates generally to systems on chips, and in particular to methods and mechanisms for routing transactions in a system on chip.

2. Description of the Related Art

Systems on chips (SoCs) are increasing in complexity and size due to continual technological advances in the electronics industry. A common SoC may include multiple input/output (I/O) devices connected to a processor complex containing one or more processors. The processor complex may typically include one or more processors and one or more caches, and the processor complex may be coupled to a CPU port of a memory controller through which the processor complex may access a memory. The I/O devices may be coupled to a coherency port on the processor complex and access memory through the CPU port of the memory controller.

A portion of the traffic from the I/O devices may be cache coherent. Another portion of the traffic from the I/O devices may be low-performance transactions, and some of the low-performance transactions may be directed to non-shareable memory. Typically, the cost of checking every transaction for cache coherency is high, in terms of hardware, performance, and power. In addition, the traffic from the I/O devices may compete with the processor complex for memory bandwidth on the CPU port on the memory controller. Furthermore, the traffic from the I/O devices may also unnecessarily cause snoop activity to take place in the processor complex.

SUMMARY

In one embodiment, an apparatus may include one or more processors, a memory controller, one or more I/O devices, and a coherence switch. The one or more processors may be located in a processor complex, and the processor complex may be coupled to a real-time port of the memory controller. The processor complex may include one or more levels of caches, and the processor complex may also include a coherency port coupled to the coherence switch. The coherence switch may be coupled to the one or more I/O devices, to the processor complex, and to the memory controller. In some embodiments, the apparatus may include a non-real-time (NRT) block, and the coherence switch may be coupled to the memory controller via the NRT block. The apparatus may also include a multiplexer, and the coherence switch may be coupled to the one or more I/O devices via the multiplexer.

The coherence switch may receive transactions from the I/O device(s), and the coherence switch may route received transactions to the memory controller on two separate paths within the apparatus. The first path may pass through a coherency port on the processor complex and through a first port of the memory controller. Traffic from sources that are known to be coherent may be routed to memory via the first path. A second path may pass through a NRT block and through a second port of the memory controller. Traffic from sources that are known to be non-coherent may be routed to memory via the second path. The sources that are known to be non-coherent may generate transactions that access only non-shareable memory. In one embodiment, the coherence switch may determine which path to route a transaction based on an identifier that accompanies the transaction.

In various embodiments, the coherence switch may be configured to dynamically reallocate traffic from the coherent path to the non-coherent path or from the non-coherent path to the coherent path. The coherence switch may maintain a configuration register, and the configuration register may store an indicator for each transaction identifier. The indicator may specify whether the corresponding transaction should be routed to memory via the coherent or non-coherent path. In one embodiment, the coherence switch may maintain two copies of the configuration register. The first copy of the configuration register may be a software-writeable copy and the second copy of the configuration register may be a working copy. The working copy may also be referred to as a shadow copy.

Having two copies of the configuration register may facilitate dynamic switching of traffic. For example, the two copies of the configuration register may allow software to initiate a change to the configuration register, while the coherence switch hardware may control actual changes to system behavior. Specifically, a software application may update the software-writeable copy of the configuration register to reallocate traffic flows on a transaction identifier basis. The coherence switch may detect the update to the software-writeable copy, and then the coherence switch may update the working copy which is used to actually implement the new routing.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 1 is a block diagram that illustrates one embodiment of a portion of an integrated circuit.

FIG. 2 is a block diagram that illustrates the routing of transactions by a coherence switch.

FIG. 3 is a block diagram that illustrates one embodiment of a coherence switch.

FIG. 4 is a block diagram of a configuration unit interface in accordance with one or more embodiments.

FIG. 5 is a block diagram of one embodiment of a shadow copy of a configuration register.

FIG. 6 is a generalized flow diagram illustrating one embodiment of a method for routing transactions and operating a coherence switch.

FIG. 7 is a generalized flow diagram illustrating one embodiment of a method for updating a configuration register of a coherence switch.

FIG. 8 is a block diagram of one embodiment of a system.

FIG. 9 is a block diagram illustrating one embodiment of a computer readable medium.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a cache . . . . " Such a claim does not foreclose the processor from including additional components (e.g., a network interface, a crossbar).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical) unless explicitly defined as such. For example, in a memory controller having five ports, the terms "first" and "second" ports can be used to refer to any two of the five ports.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an integrated circuit (IC) is shown. In the illustrated embodiment, IC 10 includes a coherence switch 12, multiplexer 14, direct memory access (DMA) controller 15, I/O devices 16, 18, and 20, processor complex 22, non-real-time (NRT) block 26, memory controller 30, and memory physical interface circuits (PHYs) 38 and 40. It is noted that IC 10 may also include many other components and connections not shown in FIG. 1. In various embodiments, IC 10 may also be referred to as a system on chip (SoC), as an application specific integrated circuit (ASIC), or as an apparatus.

Components shown within IC 10 may be coupled to each other using any suitable bus and/or interface mechanism. In some embodiments, these components may be connected using the Advanced Microcontroller Bus Architecture (AMBA®) protocol (from ARM® Holdings) or any other suitable on-chip interconnect specification for the connection and management of logic blocks. Examples of AMBA buses and/or interfaces may include Advanced eXtensible Interface (AXI), Advanced High-performance Bus (AHB), Advanced System Bus (ASB), Advanced Peripheral Bus (APB), and Advanced Trace Bus (ATB).

IC 10 includes coherence switch 12, and coherence switch 12 may be a programmable switch that software can configure dynamically. As shown in FIG. 1, coherence switch 12 is coupled to port 36 of the memory controller 30 via NRT block 26. In one embodiment, the connection between coherence switch 12 and NRT block 26 may be an AXI interface. In another embodiment, coherence switch 12 may be coupled directly to port 36. In a further embodiment, coherence switch 12 may be coupled to port 36 via another block or component. Coherence switch 12 is also coupled to port 32 of memory controller 30 via the advanced coherency port (ACP) 24 of processor complex 22. In one embodiment, coherence switch 12 may utilize an AXI master interface to connect to the coherency domain of processor complex 22 via ACP 24. In some embodiments, coherence switch 12 may be part of an I/O coherency bridge (not shown) or the like.

Coherence switch 12 is also coupled to multiplexer 14, and multiplexer 14 is coupled to DMA controller 15 and I/O devices 16 and 20. Multiplexer 14 is also coupled to I/O device 18 via DMA controller 15. Multiplexer 14 may include one or more buffers for buffering data from I/O devices 16-20 and/or DMA controller 15. In one embodiment, multiplexer 14 may be a PL301 High Performance Matrix from ARM Holdings. I/O devices 16-20 are representative of any number of I/O devices, and the various I/O devices may be coupled to multiplexer 14 in a variety of ways, such as directly, through DMA controller 15, and/or through another device. Variations of the types of connections between I/O devices 16-20 and multiplexer 14 are possible and are contemplated. In other embodiments, multiplexer 14 may be coupled to an I/O processor, peripheral I/O queues, and/or one or more other devices not shown in FIG. 1.

Coherence switch 12 may receive transactions from the I/O devices 16-20 and may convey the transactions to processor complex 22 or NRT block 26. In some embodiments, in response to receiving transactions, coherence switch 12 may issue corresponding memory requests to processor complex 22 or NRT block 26. Generally speaking, a transaction may comprise a memory request, and the term "memory request" is not limited to requests that are ultimately responded to by memory, but can also include requests that are satisfied by a cache. It is noted that the terms "memory request", "transaction", and "memory operation" may be used interchangeably throughout this disclosure.

Although not shown in FIG. 1, the processor complex 22 may include one or more processors, caches, cache controllers, control units, and various other numbers of other elements and logic components. In some embodiments, each of the processors may have its own cache (e.g., L1 cache). Processor complex 22 may enable I/O devices 16-20 to access system memory while maintaining coherency between the cache(s) and the system memory. I/O devices 16-20 may include any device configured to or capable of interacting with processor complex 22 and/or system memory (not shown). Examples of I/O devices 16-20 include audio controllers, video or graphics controllers, universal serial bus (USB) controllers, interface controllers, networking media access controllers (MAC) such as Ethernet MACs or WiFi (IEEE 802.11) controllers, and various other devices. It is noted that I/O devices 16-20 may also be referred to as peripheral devices or I/O peripherals.

Memory controller 30 includes ports 32, 34, and 36, which are representative of any number of ports. Port 32 may be coupled to processor complex 22. In one embodiment, port 32 may be designated to receive real-time (RT) memory requests. Port 36 may be coupled to NRT block 26. In one embodiment, port 36 may be designated to receive NRT memory requests. Generally speaking, NRT memory requests may be treated as a lower priority than RT memory requests by memory controller 30. Port 34 may be coupled to another block (not shown) of IC 10. For example, in one embodiment, port 34 may be coupled to a RT peripheral block. In another embodiment, port 34 may be coupled to a graphics controller.

The memory controller 30 may include circuitry configured to interface to memory (not shown). For example, the memory controller 30 may be configured to interface to dynamic random access memory (DRAM) such as synchronous DRAM (SDRAM), double data rate (DDR) SDRAM, DDR2 SDRAM, Rambus DRAM (RDRAM), etc. Memory controller 30 may also be coupled to memory physical interface circuits (PHYs) 38 and 40. Memory PHYs 38 and 40 are representative of any number of memory PHYs which may be coupled to memory controller 30. The memory PHYs 38 and 40 may be configured to interface to memories. The memory controller 30 may receive memory requests from processor complex 22, NRT block 26, and other blocks (not shown), and memory controller 30 may perform the corresponding read and write operations to the memory.

The coherence switch 12 may determine if a transaction received from an I/O device (via multiplexer 14) is a cache-coherent or non-cache-coherent transaction using a variety of methods. Throughout this disclosure, a cache-coherent transaction may be referred to as a "coherent transaction" or "coherent memory request", and a non-cache-coherent transaction may be referred to as a "non-coherent transaction" or "non-coherent memory request". Generally speaking, a non-coherent transaction may correspond to a memory operation that is not checked against a cache. In one embodiment, the coherence switch 12 may determine if a transaction is coherent or non-coherent based on the I/O device from which the transaction is received. A first portion of I/O devices 16-20 may be designated as coherent devices, and a second portion of I/O devices 16-20 may be designated as non-coherent devices. In another embodiment, the coherence switch 12 may determine if a transaction is coherent or non-coherent based on a transaction identifier. Each I/O device may be assigned a range of transaction identifiers, and the identifiers may be designated for use as coherent or non-coherent transactions.

In various embodiments, the I/O devices 16-20 may obtain access to memory via multiplexer 14, coherence switch 12, and then through either processor complex 22 or NRT block 26. For example, an originating I/O device may issue a read or write request to memory. The request may pass through multiplexer 14 and then coherence switch 12 may receive the request and determine if the request should be routed to the processor complex 22 (for coherent requests) or to NRT block 26 (for non-coherent requests). For coherent traffic, the processor complex 22 may provide a mechanism to snoop the cache. If there is a cache hit, the processor complex 22 may provide a response to coherence switch 12. If there is a cache miss, the processor complex 22 may forward the request to memory. For non-coherent traffic, coherence switch 12 may forward the request to NRT block 26 and then NRT block 26 may forward the request to memory (via memory controller 30).

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

Figure 2:
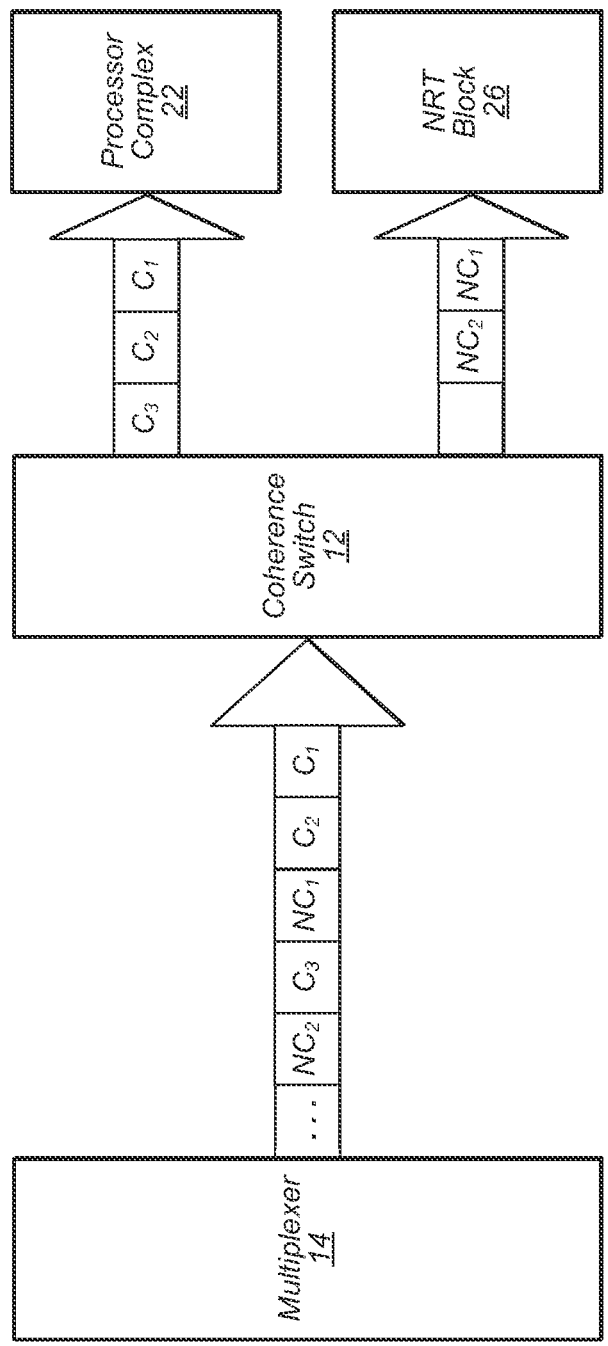

Turning now to FIG. 2, a block diagram of one embodiment of the operation of coherence switch 12 is shown. In one embodiment, multiplexer 14 may couple traffic to coherence switch 12. As shown in FIG. 2, coherent transactions are indicated by a capital "C", with a subscript identifying different coherent transactions. For example, $C_1$ may be the first coherent request received by coherence switch 12, $C_2$ may be received subsequent to $C_1$, and so on. Non-coherent transactions are indicated by a capital "NC", with a subscript identifying different non-coherent requests. In some embodiments, the transactions may be broken up into packets, and the blocks in FIG. 2 may represent either transactions or packets.

Coherence switch 12 may receive the transactions from multiplexer 14 and the coherent and non-coherent transactions may be intermingled. As shown in FIG. 2, transactions may arrive at coherence switch 12 in the following order: $C_1$, $C_2$, $NC_1$, $C_3$, $NC_2$. In one embodiment, coherence switch 12 may identify transactions as coherent or non-coherent based on identifiers accompanying the transactions. The coherence switch 12 may route coherent transactions ($C_1$, $C_2$, and $C_3$) to the processor complex 22. The coherence switch 12 may route non-coherent transactions ($NC_1$ and $NC_2$) to the NRT block 26. In a similar fashion (not shown in FIG. 2), traffic returning from memory via processor complex 22 and NRT block 26 may be interleaved in coherence switch 12 and conveyed back to the multiplexer 14 on a single path as the return traffic makes its way back to the originating I/O devices.

Figure 3:
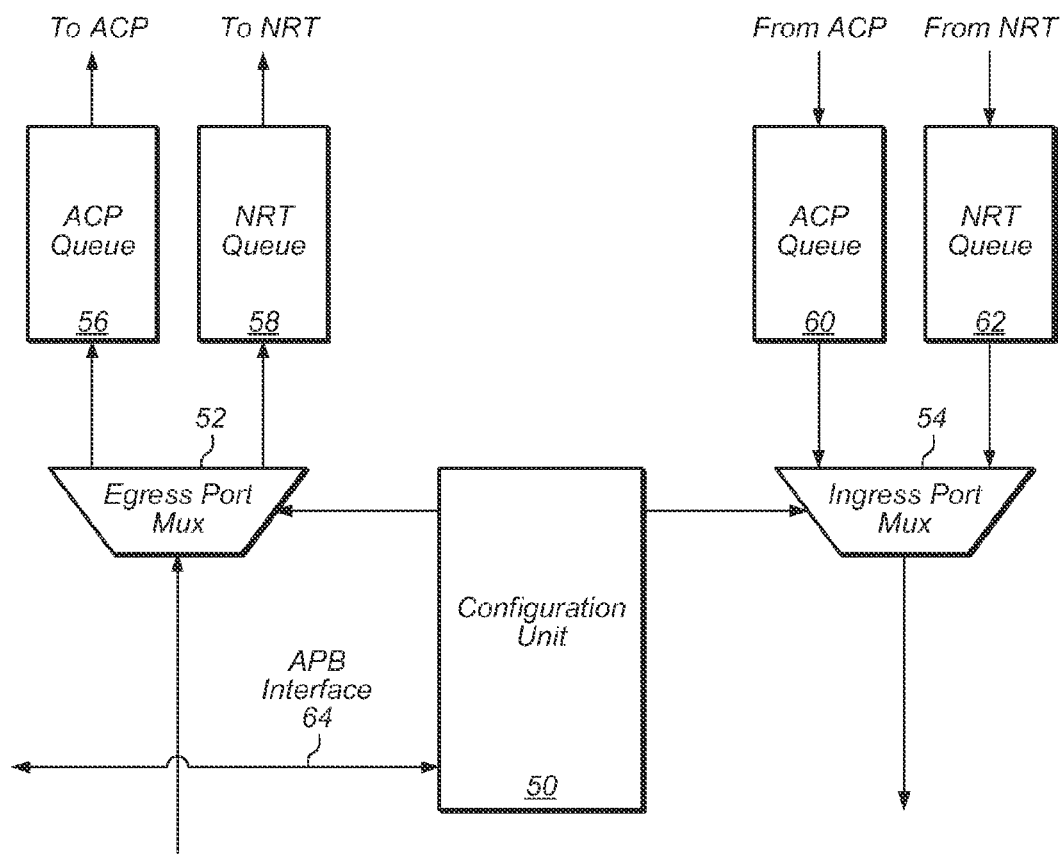

Referring now to FIG. 3, a block diagram of one embodiment of a coherence switch is shown. The configuration unit 50 may be coupled to egress port multiplexer 52 and ingress port multiplexer 54. In various embodiments, unit 50 may send transaction identifiers, ready signals, valid signals, and/or other configuration and control signals to egress port multiplexer 52 and ingress port multiplexer 54.

ACP queue 56 may store coherent transactions coupled from egress port multiplexer 52, and then ACP queue 56 may convey the coherent transactions to the ACP of the processor complex (not shown). Similarly, NRT queue 58 may store non-coherent transactions coupled from egress port multiplexer 52, and then NRT queue 58 may convey the coherent transactions to the NRT block (not shown). ACP queue 60 may store coherent transaction return data coupled from the processor complex, and then ACP queue 60 may convey the return data to ingress port multiplexer 54. Similarly, NRT queue 62 may store non-coherent transaction return data coupled from the NRT block, and then NRT queue 62 may convey the return data to ingress port multiplexer 54. Although not shown in FIG. 3, the input and output interfaces of multiplexer 52 may include separate channels for address and data associated with upstream write transactions.

In one embodiment, ingress port multiplexer 54 may intermingle data associated with coherent and non-coherent transactions on the return path to the I/O devices. Ingress port multiplexer 54 may intermingle the data associated with coherent and non-coherent transactions in the order in which the data is received from ACP queue 60 and NRT queue 62. In various embodiments, the queues 56-62 may be any of various sizes to store any number of transactions or any amount of return data associated with transactions.

In one embodiment, configuration unit 50 may be accessible via an advanced peripheral bus (APB) interface or the like. For example, a software application running on an external device or processor (not shown) may utilize the APB interface 64 for programming or configuring the configuration unit 50. The APB interface 64 may be independent of the transactions and data that pass through coherence switch 12.

Figure 4:
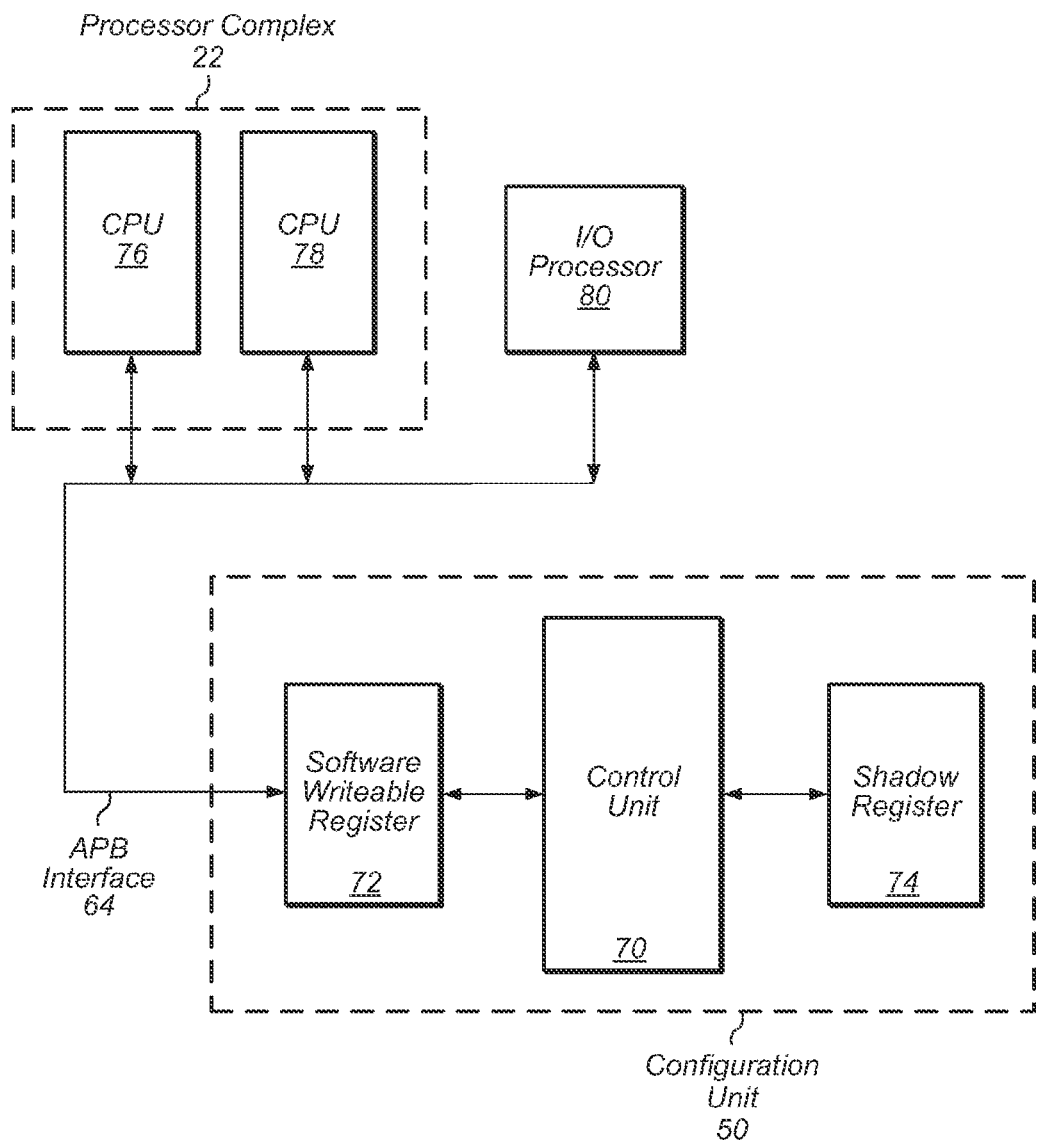

Turning now to FIG. 4, a block diagram of an interface coupled to a configuration unit of a coherence switch in accordance with one or more embodiments is shown. The APB interface 64 may be utilized for writing to the software-writeable register 72 to update the values for one or more transaction identifiers. The software-writeable register 72 may include an indicator for each transaction identifier. In one embodiment, each transaction identifier may be 9 bits long, and software-writeable register 72 may have 512 total entries for each possible identifier value. In other embodiments, the transaction identifier may have a different bit-length. Shadow register 74 may also be organized in a similar fashion to software-writeable register 72. It is noted that shadow register 74 may also be referred to as the shadow copy of the configuration register or as the working copy of the configuration register.

In one embodiment, in response to a system or software reset, all of the values in registers 72 and 74 may be set to zero, wherein a value of zero corresponds to the coherent path. As a result of the reset, each of the values of registers 72 and 74 may indicate that the coherent path should be taken for each transaction identifier. This may be the default setting for each transaction identifier. It is noted that in other embodiments, a value of one in registers 72 and 74 may correspond to the coherent path, and zero may correspond to the non-coherent path.

In one embodiment, CPU 76 or 78 may write to software-writeable register 72 via APB interface 64 to change the routing settings for transaction identifiers assigned to one or more I/O devices. In another embodiment, I/O processor 80 may write to software-writeable register 72 via APB interface 64 to change the routing settings for various transaction identifiers. In a further embodiment, another device (not shown) may write to software-writeable register 72 via APB interface 64 to change the routing settings for one or more transaction identifiers. As shown in FIG. 4, three devices (CPUs 76 and 78 and processor 80) are coupled to APB interface 64. However, in other embodiments, other numbers of devices may be coupled to APB interface 64.

In one embodiment, after detecting a change to the software-writeable register 72, coherence switch 12 may stop accepting new transactions from I/O devices 16-20 (of FIG. 1). Coherence switch 12 may process all of the pending transactions, update the shadow register 74 to reflect the change(s) made to software-writeable register 72, and then coherence switch 12 may start accepting new transactions from I/O devices 16-20.

Configuration unit 50 may keep track of outstanding transactions through the use of one or more counters (not shown). In one embodiment, configuration unit 50 may utilize a first counter to maintain a count of the outstanding write transactions, and configuration unit 50 may utilize a second counter to maintain a count of the outstanding read transactions. When an update to the software-writeable register 72 is detected, configuration unit 50 may stop accepting new transactions until all outstanding write transactions have been processed. Configuration unit 50 may utilize the first counter to determine when all of the write transactions have been processed. The routing indicators in the software-writeable register 72 may not affect the return path of the read transactions, and so in some embodiments, the number of outstanding read transactions may not be monitored. In another embodiment, configuration unit 50 may maintain separate counters for the number of outstanding coherent write transactions and for the number of outstanding non-coherent write transactions.

In one embodiment, a coherence switch may include a split-bus architecture with separate address and data buses for write transactions. In such an embodiment, configuration unit 50 may utilize a counter to detect whether or not there any pending write transactions. In one embodiment, the counter may be initialized to a particular value which represents a state in which no transaction are pending. For example, for an 8-bit counter that counts from 0 to 255, the particular (initial) value of the counter may be set to 128. The counter may be incremented when the address portion of a transaction is received, and the increment may be proportional to the amount of data associated with the transaction. Furthermore, the counter may be decremented each time a write data beat is received. When the counter is equal to its initial (particular) value, this will indicate that all of the address and data of the outstanding write transactions have been received by the coherence switch and no write transactions are outstanding. Additionally, when the counter is back to its initial value, configuration unit 50 may then update the shadow copy of the configuration register based on the update to the software-writeable copy after a change to the software-writeable copy has been detected.

Referring now to FIG. 5, one embodiment of a shadow copy of a configuration register is shown. Shadow register 74 is shown in FIG. 5, and software-writeable register 72 (of FIG. 4) may be arranged in a similar fashion to shadow register 74. Shadow register 74 may store a routing indicator for each address, and the routing indicator may be a single bit (i.e., 0 or 1). For example, in one embodiment, a routing indicator of '0' may designate the coherent path for a particular address and a routing indicator of '1' may designate the non-coherent path. Also, in one embodiment, the address may be the 9-bit identifier accompanying the transaction. In another embodiment, the transaction identifier may be mapped to a value that is used to access the address entry in shadow register 74. The routing indicator may indicate whether or not the corresponding transaction identifier, represented by the address value, is a coherent or non-coherent transaction. In other embodiments, the routing indicator may be a Boolean value (i.e., TRUE or FALSE), may be represented with more than a single bit, or may be represented by various other values or designations.

In another embodiment, shadow register 74 may be split up into multiple registers, with each register corresponding to an address range which is a portion of the total address range. Shadow register 74 is shown in FIG. 5 as containing 512 entries, but this is for illustrative purpose only. It is noted that shadow register 74 may include other numbers of address entries in other embodiments. It is further noted that in other embodiments, shadow register 74 may include other information and may be organized in any suitable manner. For example, in another embodiment, each entry of shadow register 74 may include a valid field to indicate if the particular address or identifier is currently being used or is "in flight" (i.e., has an outstanding transaction).

In various embodiments, each I/O device may be assigned a range of addresses to be used for transactions. For example, one I/O device may be assigned addresses 0-15 for its transactions, another I/O device may be assigned addresses 16-23, and so on. In some embodiments, each I/O device may be designated as either a source of coherent transactions or as a source of non-coherent transactions. In other embodiments, an individual I/O device may be a source of both coherent and non-coherent transactions.

In further embodiments, a specific transaction identifier or address may be designated as a coherent transaction. An I/O device may utilize the specific transaction identifier for a coherent transaction, and then at some point in the future, the I/O device may decide to use the specific transaction identifier for a non-coherent transaction. The I/O device may update the software-writeable copy of the configuration register to change the routing indicator for the specific transaction, and then in one embodiment, the I/O device may send a barrier instruction to the coherence switch prior to sending the non-coherent transaction. The barrier instruction may allow the coherence switch time to update the shadow copy of the configuration register to match the software-writeable copy. The barrier instruction may also serve as notice to the coherence switch that an update to the shadow copy of the configuration register has taken place.

In a still further embodiment, the update to the software-writeable copy of the configuration register may occur after the coherence switch has received only the address portion of a particular transaction. In this case, the coherence switch may not update the shadow copy of the configuration register until all of the beats from the relevant data traffic have been received for this particular transaction. The coherence switch may utilize the previously-described counter mechanism to determine when there are no transactions outstanding.

Figure 6:
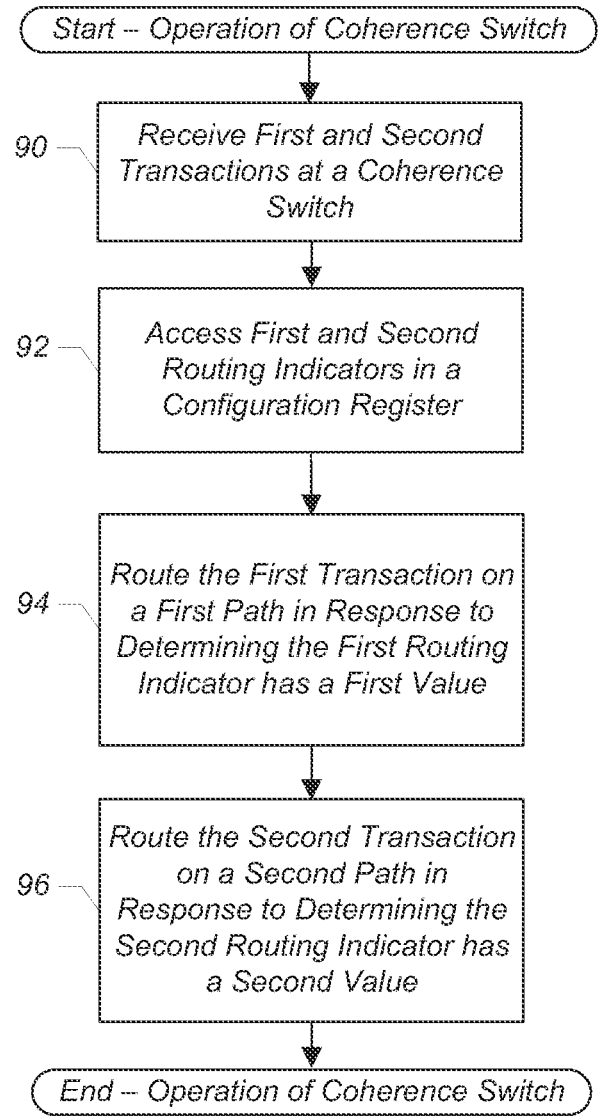

Turning now to FIG. 6, one embodiment of a method for routing transactions and operating a coherence switch is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a plurality of transactions, including first and second transactions, may be received at a coherence switch (block 90). The transactions may be generated by one or more I/O devices. The I/O device(s) may be coupled to the coherence switch through a multiplexer, DMA controller, and/or other devices. The first and second transactions may be accompanied by first and second identifiers, respectively. After receiving the first and second transactions, the coherence switch may access first and second routing indicators in a configuration register (block 92). In one embodiment, the coherence switch may utilize the first and second identifiers as indices or addresses into the configuration register to access the first and second routing indicators, respectively.

The coherence switch may route the first transaction on a first path in response to determining the first routing indicator has a first value (block 94). In one embodiment, the first value may be '0' indicating the first transaction is a coherent request. The first path may go from the coherence switch to the ACP of a processor complex. The coherence switch may route the second transaction on a second path in response to determining the second routing indicator has a second value (block 96). In one embodiment, the second value may be '1' indicating the second transaction is a non-coherent request. The second path may go from the coherence switch to a non-real-time (NRT) block and then to a NRT port of a memory controller.

Figure 7:
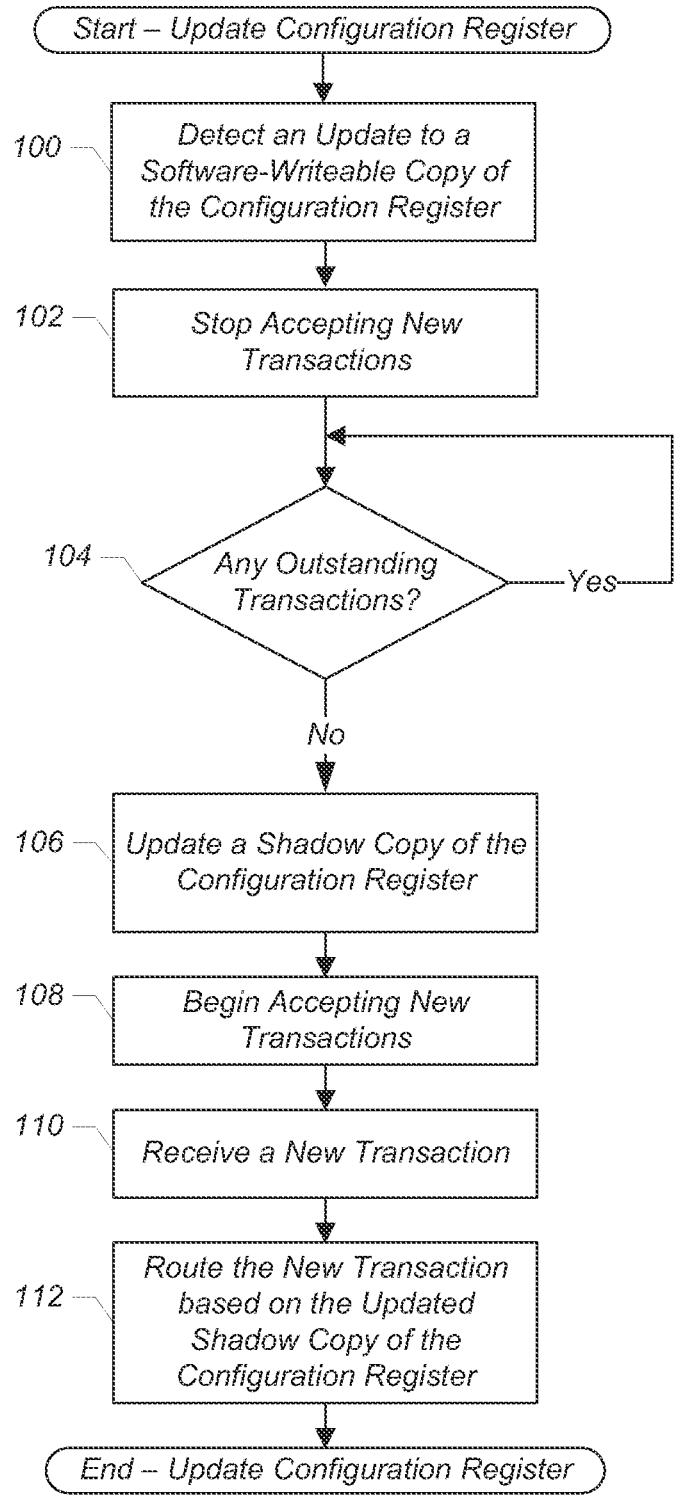

Turning now to FIG. 7, one embodiment of a method for updating a configuration register of a coherence switch is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The coherence switch may be configured to detect an update to a software-writeable copy of the configuration register (block 100). Then, after detecting the update, the coherence switch may stop accepting new transactions from the connected I/O devices (block 102). Next, the coherence switch may determine if there are any outstanding transactions still in-flight (conditional block 104). In one embodiment, the coherence switch may utilize a counter mechanism such as that discussed above to determine if there are any outstanding transactions. As previously described, if the counter is equal to a predetermined value, this may indicate that all pending transactions have been processed. In other embodiments, the coherence switch may utilize other mechanisms to determine whether or not there are any outstanding transactions that need to be completed.

If there are not any outstanding transactions still in-flight (conditional block 104), then the coherence switch may update a shadow copy of the configuration register (block 106). If the coherence switch determines there are outstanding transactions still in-flight (conditional block 104), then the coherence switch may wait until all outstanding transactions are completed before updating the shadow copy. After block 106, the coherence switch may begin accepting new transactions (block 108). Then, the coherence switch may receive a new transaction (block 110). The coherence switch may route the new transaction based on the updated shadow copy of the configuration register (block 112). In one embodiment, the transaction may include an identifier, and the coherence switch may look up the identifier in the shadow copy of the configuration register to find a corresponding routing indicator.

Figure 8:
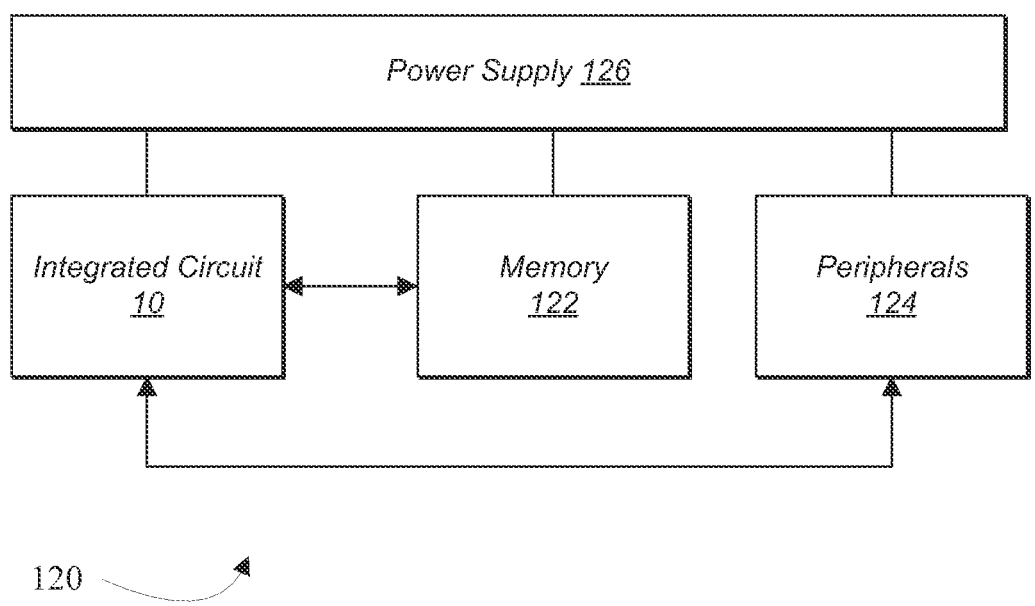

Referring now to FIG. 8, a block diagram of one embodiment of a system 120 is shown. In the illustrated embodiment, the system 120 includes at least one instance of the integrated circuit 10 coupled to memory 122. The integrated circuit 10 is coupled to one or more peripherals 124 and the memory 122. A power supply 126 is also provided which supplies the supply voltages as well as one or more supply voltages to the integrated circuit 10, memory 122, and/or the peripherals 124. In other embodiments, more than one power supply 126 may be provided. In some embodiments, more than one instance of the integrated circuit 10 may be included (and more than one memory 122 may be included as well).

The memory 122 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc.

The peripherals 124 may include any desired circuitry, depending on the type of system 120. For example, in one embodiment, the system 120 may be a mobile device (e.g., personal digital assistant (PDA), smart phone, electronic reading device) and the peripherals 124 may include devices for various types of wireless communication, such as Wi-Fi, Bluetooth, cellular, global positioning system, etc. The peripherals 124 may also include additional storage, including RAM storage, solid state storage, or disk storage. The peripherals 124 may include user interface devices such as a display screen, including touch display screens or multitouch display screens, keyboard or other input devices, microphones, speakers, etc. In other embodiments, the system 120 may be any type of computing system (e.g., desktop personal computer, laptop, workstation, video game console, television, nettop).

Figure 9:
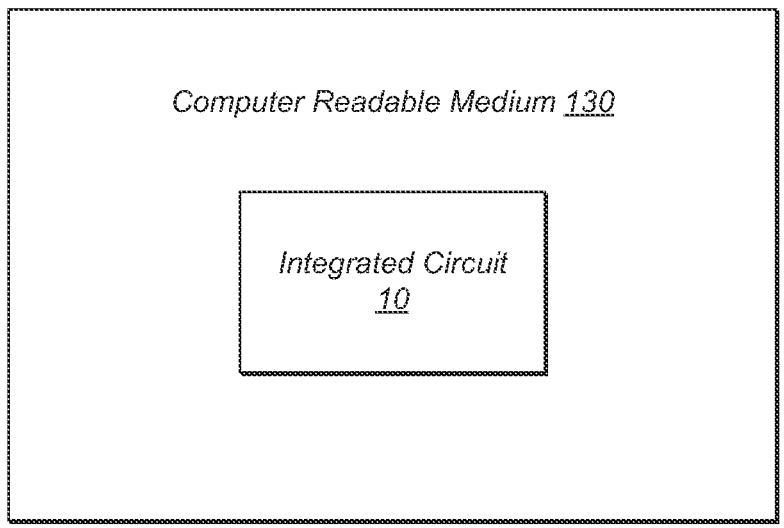

Turning now to FIG. 9, one embodiment of a block diagram of a computer readable medium 130 including one or more data structures representative of the circuitry included in the integrated circuit (IC) 10 (of FIG. 1) is shown. Generally speaking, computer readable medium 130 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 130 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 130 may be the netlist(s) (with or without the synthesis library) or the data set(s), as desired. In yet another alternative, the data structures may comprise the output of a schematic program, or netlist(s) or data set(s) derived therefrom.

While computer readable medium 130 includes a representation of the IC 10, other embodiments may include a representation of any portion or combination of portions of the IC 10 (e.g., coherence switch 12, multiplexer 14, processor complex 22, NRT block 26, memory controller 30).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a memory controller comprising a plurality of ports;
a processor complex coupled to a first port of the memory controller;
one or more input/output (I/O) devices; and
a coherence switch coupled to receive transactions from the one or more I/O devices;
wherein the coherence switch is configured to:
determine if a received transaction is a coherent transaction or a non-coherent transaction, wherein a non-coherent transaction is a transaction for which a coherency check is not performed;
route a received transaction on a first path to a first port of the memory controller responsive to determining the transaction is a coherent transaction, wherein the first path passes through the processor complex;
route the received transaction on a second path to a second port of the memory controller responsive to determining the received transaction is a non-coherent transaction, wherein the second path bypasses the processor complex;
maintain two copies of a configuration register, wherein a first copy is a software-writeable copy of the configuration register and a second copy is a working copy of the configuration register, wherein each copy stores an indicator for each transaction identifier that specifies whether a corresponding transaction should be routed to memory via the first path or via the second path;
responsive to detecting a change to the software-writeable copy of the configuration register:
stop accepting new transactions from the plurality of I/O devices; and
responsive to determining all outstanding transactions have been routed:
update the working copy of the configuration register to match the software-writeable copy of the configuration register; and
accept new transactions from the plurality of I/O devices.

2. The apparatus as recited in claim 1, wherein the coherence switch is configured to determine if the received transaction is a coherent transaction based on at least one of an identifier corresponding to the received transaction, and a determination as to whether the received transaction targets shareable memory.

3. The apparatus as recited in claim 1, wherein the coherence switch is further configured to:
monitor a number of outstanding transactions.

4. The apparatus as recited in claim 1, wherein the coherence switch is coupled to the plurality of I/O devices via a multiplexer.

5. The apparatus as recited in claim 1, wherein the memory controller is configured to:
receive real-time memory requests on the first port; and
receive non-real-time memory requests on the second port.

6. The apparatus as recited in claim 5, wherein the memory controller is configured to receive transactions on each port of the plurality of ports concurrently.

7. The apparatus as recited in claim 1, wherein the processor complex is configured to receive coherent transactions from the coherence switch via a coherency port, wherein the processor complex comprises one or more caches, and wherein the processor complex is configured to snoop transactions received via the coherency port.

8. An apparatus comprising:
a coherence switch;
a processor complex comprising one or more processors;
a memory controller coupled to the processor complex and to the coherence switch; and
a plurality of I/O devices;
wherein the coherence switch is configured to:
maintain a working copy of a configuration register and a shadow copy of the configuration register, wherein the shadow copy is a software-writeable copy of the working copy of the configuration register, wherein each copy stores an indicator for each transaction identifier that specifies whether a corresponding transaction should be routed to memory via a coherent path or via a non-coherent path;
receive a plurality of transactions from the plurality of I/O devices;
select either a coherent path or a non-coherent path for routing a received transaction based at least in part on a value stored in the shadow copy of the configuration register, wherein the indicator specifies if a received transaction is a coherent transaction or a non-coherent transaction, wherein a non-coherent transaction is a transaction for which a coherency check is not performed, wherein the coherent path passes through the processor complex to a first port of the memory controller, and wherein the non-coherent path bypasses the processor complex and passes through a second port of the memory controller; and
responsive to detecting a change to the shadow copy of the configuration register:
stop accepting new transactions from the plurality of I/O devices; and
responsive to determining all outstanding transactions have been routed:
update the working copy of the configuration register to match the shadow copy of the configuration register; and
accept new transactions from the plurality of I/O devices.

9. The apparatus as recited in claim 8, wherein the apparatus further comprises an I/O processor located external to the processor complex which is configured to update the software-writeable copy of the configuration register.

10. The apparatus as recited in claim 8, wherein the apparatus further comprises a multiplexer, and wherein the coherence switch is further configured to:
receive return data on two separate ports;
intermingle the received data from the two separate ports; and
convey the intermingled data on a single path to the multiplexer.

11. The apparatus as recited in claim 10, wherein the multiplexer is coupled to the plurality of I/O devices.

12. The apparatus as recited in claim 8, wherein the value is a single bit.

13. The apparatus as recited in claim 8, wherein an identifier accompanying the transaction is utilized as an index into the shadow copy of the configuration register to access a respective value.

14. A method comprising:
receiving a first transaction and a second transaction at a coherence switch, wherein a first identifier accompanies the first transaction, and wherein a second identifier accompanies the second transaction;
accessing a first routing indicator in a configuration register using the first identifier, and accessing a second routing indicator in the configuration register using the second identifier, wherein the configuration register is configured to store an indicator which specifies whether a received transaction should be routed to memory via a first path or a second path, wherein a non-coherent transaction is a transaction for which a coherency check is not performed;
routing the first transaction on a first path responsive to the first routing indicator having a first value, wherein the first path passes through a processor complex to a first port of a memory controller;
routing the second transaction on a second path responsive to the second routing indicator having a second value, wherein the second value is different than the first value, and wherein the second path is coupled to a second port of the memory controller without passing through the processor complex;
maintaining two copies of a configuration register, wherein a first copy is a software-writeable copy of the configuration register and a second copy is a working CODY of the configuration register, wherein each coin stores an indicator for each transaction identifier that specifies whether a corresponding transaction should be routed to memory via the first path or via the second path;
responsive to detecting a change to the software-writeable copy of the configuration register:
stop accepting new transactions from the plurality of I/O devices; and
responsive to determining all outstanding transactions have been routed:
updating the working copy of the configuration register to match the software-writeable copy of the configuration register; and
accepting new transactions from the plurality of I/O devices.

15. The method as recited in claim 14, wherein coherent transactions are routed on the first path, and wherein non-coherent transactions are routed on the second path.

16. The method as recited in claim 14, wherein the first value indicates the first transaction is a coherent transaction, and wherein the second value indicates the second transaction is a non-coherent transaction.

17. The method as recited in claim 14, wherein an update to the software-writeable copy of the configuration register is detected by comparing the software-writeable copy of the configuration register to the shadow copy of the configuration register.

18. A system comprising:
a processor complex comprising one or more processors;
a coherence switch coupled to the processor complex;
a multiplexer coupled to the coherence switch;
a plurality of I/O devices coupled to the multiplexer;
a memory controller comprising a plurality of ports, wherein the memory controller is coupled to the processor complex and to the coherence switch; and
a memory coupled to the memory controller;
wherein the coherence switch is configured to:
maintain a working copy of a configuration register and a shadow copy of the configuration register, wherein the shadow copy is a software-writeable copy of the working copy of the configuration register, wherein each copy stores an indicator for each transaction identifier that specifies whether a corresponding transaction should be routed to memory via a coherent path or via a non-coherent path;
receive a plurality of transactions from the plurality of I/O devices via the multiplexer;

for each transaction, determine if the transaction is a coherent or non-coherent transaction;
responsive to determining a received transaction is a coherent transaction, route the received transaction directly to the processor complex;
responsive to determining a received transaction is a non-coherent transaction, route the received transaction directly to the memory controller wherein a non-coherent transaction is a transaction for which a coherency check is not performed;
responsive to detecting a change to the shadow copy of the configuration register:
    stop accepting new transactions from the plurality of I/O devices; and
    responsive to determining all outstanding transactions have been routed:
        update the working copy of the configuration register to match the shadow copy of the configuration register; and
        accept new transactions from the plurality of I/O devices.

19. The system as recited in claim 18, wherein the pending update to the configuration register only applies to a first portion of the plurality of I/O devices, wherein a second portion of the plurality of I/O devices is unaffected by the pending update to the configuration register, and wherein responsive to detecting the pending update to the configuration register, the coherence switch is configured to:
    stop accepting new transactions from the first portion of the plurality of I/O devices; and
    accept new transactions from the second portion of the plurality of I/O devices.

20. The system as recited in claim 18, wherein the coherence switch is further configured to: monitor a number of outstanding coherent write transactions; and monitor a number of outstanding non-coherent write transactions.

* * * * *

UNITED STATES PATENT AND TRADEMARK OFFICE
CERTIFICATE OF CORRECTION

PATENT NO.          : 9,176,913 B2                                          Page 1 of 1
APPLICATION NO.     : 13/226718
DATED               : November 3, 2015
INVENTOR(S)         : Millet et al.

It is certified that error appears in the above-identified patent and that said Letters Patent is hereby corrected as shown below:

In the Claims:

Column 12, Claim 3, Line 50, please delete "to:" and substitute -- to --.

Column 14, Claim 14, Line 20, please delete "CODY" and substitute -- copy --.

Column 14, Claim 14, Line 21, please delete "coin" and substitute -- copy --.

Signed and Sealed this
Twenty-third Day of February, 2016

Michelle K. Lee
*Director of the United States Patent and Trademark Office*